No. 631,696. Patented Aug. 22, 1899.
J. W. CARTER.
STRAINER ATTACHMENT FOR TEA OR COFFEE TRAYS.
(Application filed Dec. 28, 1898.)
(No Model.)
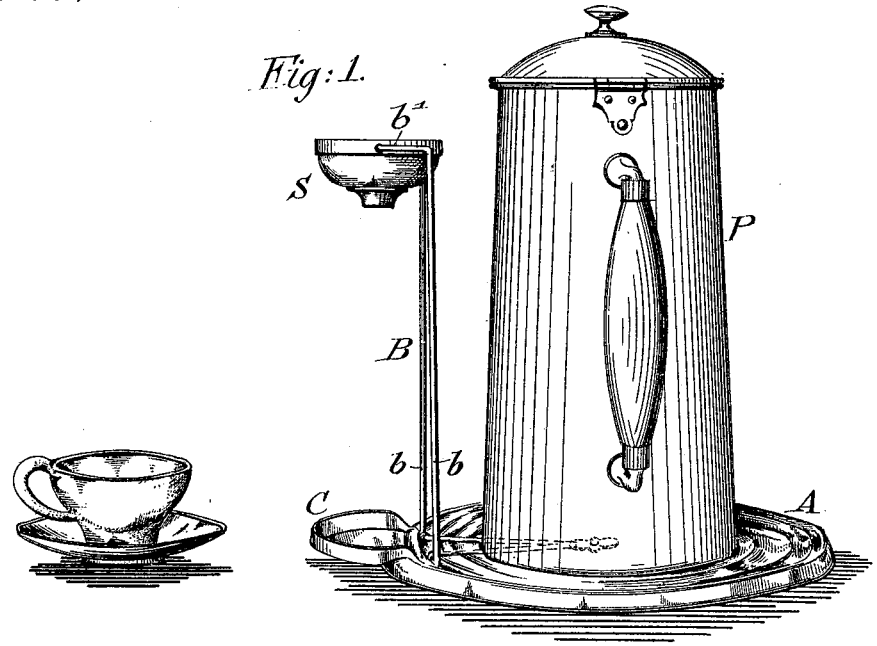
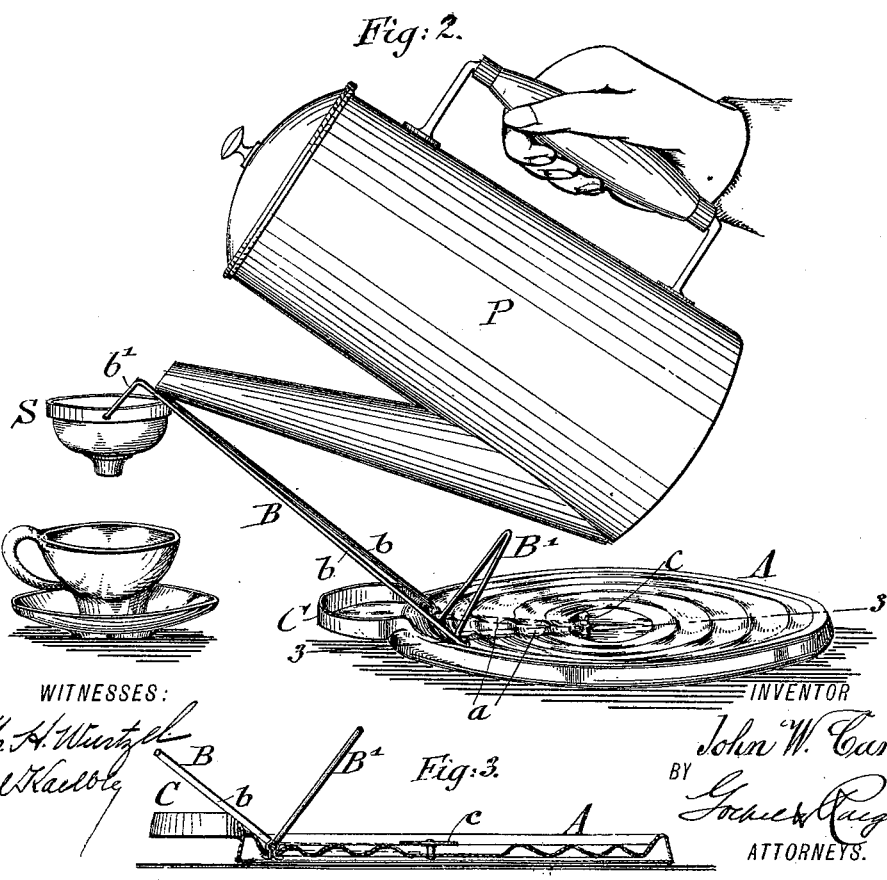
WITNESSES:
INVENTOR
John W. Carter
BY
ATTORNEYS.

UNITED STATES PATENT OFFICE.

JOHN W. CARTER, OF NEW YORK, N. Y.

STRAINER ATTACHMENT FOR TEA OR COFFEE TRAYS.

SPECIFICATION forming part of Letters Patent No. 631,696, dated August 22, 1899.

Application filed December 28, 1898. Serial No. 700,503. (No model.)

*To all whom it may concern:*

Be it known that I, JOHN W. CARTER, a citizen of the United States, residing in the city of New York, in the borough of Brooklyn and State of New York, have invented certain new and useful Improvements in Strainer Attachments for Tea or Coffee Trays, of which the following is a specification.

This invention has reference to an improved strainer attachment for tea and coffee trays, constructed in such a manner that when taking hold of the tea or coffee pot and removing it from the tray a pivotally-supported strainer above the tray assumes by gravity a position over the cup into which the tea or coffee is to be poured, said strainer being returned into position vertically above the tray on replacing the pot in its former position on the tray.

The invention consists in the combination, with a tea or coffee tray, of a supporting-frame hinged thereto and provided at its lower end with a bail extending over the tray and a strainer pivoted to the upper end of said supporting-frame, and, further, in certain details of construction and combinations of parts, to be more fully described hereinafter and finally pointed out in the claims.

In the accompanying drawings, Figure 1 represents a perspective view of a tray provided with my improved strainer attachment and showing a tea or coffee pot placed upon and a cup and saucer at the side of the tray, the strainer attachment being in position of rest. Fig. 2 is a perspective view showing the strainer attachment in position for pouring tea or coffee in the cup; and Fig. 3 is a detail vertical central section on line 3 3, Fig. 2.

Similar letters of reference indicate corresponding parts.

Referring to the drawings, A represents a tray for tea or coffee pots, which tray is made in the usual manner, preferably with concentric corrugations, and provided near one point in its circumference with a hinged wire frame B, that is bent of one piece of wire so as to form upright standards $b\ b$ and a U-shaped bail B', that is bent approximately at right angles to said uprights $b\ b$, as shown clearly in Figs. 2 and 3. The U-shaped bail B' is seated, when the frame B is placed in upright position, in corresponding grooves $a$, that extend across the corrugations of the tray. When the pot P is seated on the tray, it extends over the bail and by its weight upon the same retains the supporting-standards $b\ b$ in upright position, as shown in Fig. 1. At the upper end each standard is provided with a short forward bend $b'$, which bends are themselves bent at their extremities inwardly toward each other, said inwardly-bent portions entering perforations in the strainer S, near its upper edge, and thereby pivotally supporting the strainer. At its lower part the supporting-frame is connected at each side, at the point of bending or angle, with the tray, within and below the level of the rim of the same, by any suitable hinge-joint, that shown in Figs. 2 and 3 being simply a strap of sheet metal, the ends of which are provided with prongs, which are passed through an opening in the tray and bent outwardly at the under side of the same. Any other hinge connection of the supporting-frame with the tray may, however, be used. In use the downward movement of the wire supporting frame or crane is limited by the rim of the tray, as clearly indicated in Fig. 3.

As a further improvement the tray may be provided with a drip-cup C, attached to the tray near the point of support of the supporting-frame, said drip extension serving to catch the drip from the strainer when the same is in raised position. If desired, this extension may be stamped up with the tray, so as to be integral therewith. It is open at the side toward the tray, as shown, but may be closed, if preferred.

At a point in the tray adjacent to the bend in the bail when the wire frame is in upright position is pivoted a metal catch or button $c$, by means of which the wire frame B may be retained in upright position when a tea or coffee pot is not placed on the tray, as when the tray and attachment are set away in a closet or otherwise disposed of when not desired for immediate use.

My improved strainer attachment is used as follows: When the tea or coffee pot is placed on the tray, it presses down the bail B' of the wire crane and holds thereby the latter in upright position and the strainer above the drip extension of the tray. When the coffee or tea is to be poured, the pot is lifted away from the tray. When this is done, the strainer by gravity tilts the supporting-frame into inclined position, as shown in Fig. 2, so as to place the strainer over the cup, the cup having previously been properly located for this purpose. The coffee is then poured into the strainer until the required quantity is in the cup. The pot is then placed on the tray, so that the bottom engages the upwardly-projecting bail and returns the strainer attachment into upright position, as in Fig. 1.

The advantages of my improved strainer attachment are that the strainer is always ready for use when wanted without the annoyance caused by the loss or misplacing of the ordinary detached strainer. The tilting action is automatic as soon as the pot is removed from the tray, and the strainer is firmly held in convenient position for pouring. When it is desired to remove the strainer for cleaning or replacing with a new one, the wires of the supporting-frame are easily spread apart, so as to withdraw their bent extremities from the strainer. The strainer is replaced by reversing the operation.

Having thus described my invention, I claim as new and desire to secure by Letters Patent—

1. The combination, with a tea or coffee tray, of a supporting-frame hinged thereto and provided at its lower end with a bail extending over the tray, and a strainer pivoted to the upper end of said supporting-frame, substantially as set forth.

2. The combination, with a tea or coffee tray provided with grooves in its upper surface, of a supporting-frame hinged to said tray and provided at its lower end with a bail adapted to enter said grooves, and a strainer pivoted to the upper end of the supporting-frame, substantially as set forth.

3. The combination, with a tea or coffee tray, of a drip-cup extending therefrom, a wire supporting-frame hinged to said tray adjacent to the drip-cup, said frame consisting of uprights and a bail extending at an angle therefrom over the tray, a strainer supported above the drip-cup by said frame when the bail is lowered, and a button on said tray for engaging the bail and retaining the same in lowered position, substantially as set forth.

4. The combination, with a tea or coffee tray provided with a raised rim, of a supporting-frame hinged to said tray within and below the level of said rim and limited in its downward movement by the same, and provided at its lower end with a bail extending over the tray, and a strainer pivoted to the upper end of said supporting-frame, substantially as set forth.

In testimony that I claim the foregoing as my invention I have signed my name in presence of two subscribing witnesses.

JOHN W. CARTER.

Witnesses:
 PAUL GOEPEL,
 M. H. WURTZEL.